US006969176B2

(12) United States Patent
Pohle

(10) Patent No.: US 6,969,176 B2
(45) Date of Patent: Nov. 29, 2005

(54) SPHERICALLY-ENCLOSED FOLDED IMAGING SYSTEM

(75) Inventor: Richard Henry Pohle, Kula, HI (US)

(73) Assignee: Textron Systems Corporation, Wilmington, MA (US)

( * ) Notice: Subject to any disclaimer, the term of this patent is extended or adjusted under 35 U.S.C. 154(b) by 8 days.

(21) Appl. No.: 10/777,606

(22) Filed: Feb. 12, 2004

(65) Prior Publication Data

US 2005/0180026 A1 Aug. 18, 2005

(51) Int. Cl.[7] ............................. G02B 5/08; G02B 27/14
(52) U.S. Cl. ........................ 359/856; 359/631; 359/633
(58) Field of Search ............................. 359/631, 633, 359/727, 728, 729, 730, 731, 856–861; 244/3.16

(56) References Cited

U.S. PATENT DOCUMENTS

| | | | |
|---|---|---|---|
| 3,999,832 A | 12/1976 | Schlesinger | 359/198 |
| 4,009,848 A * | 3/1977 | Albert et al. | 244/3.16 |
| 5,363,235 A * | 11/1994 | Kiunke et al. | 359/365 |
| 5,936,771 A * | 8/1999 | Cooper | 359/618 |
| 6,614,593 B2 | 9/2003 | Sadler | 359/430 |

OTHER PUBLICATIONS

Chris Stewart, "Near Infrared Camera and Fabry-Perot Spectrometer (NIC-FPS) Optical Design Summary," Ball Aerospace & Technologies Corporation, p. 1-14, (Apr. 12, 2002).

* cited by examiner

*Primary Examiner*—Scott J. Sugarman
*Assistant Examiner*—M. Hasan
(74) *Attorney, Agent, or Firm*—Lesley A. Hamlin; Gregory M. McCloskey

(57) ABSTRACT

Systems and methods are disclosed for obtaining compact, high beam-quality imaging systems for use within a spherical housing of a sensor ball of a given size. Primary and secondary mirrors may be positioned or adapted for positioning within a spherical housing of a sensor turret or sensor ball having a window. Two or more fold mirrors may direct an optical path from the primary and secondary mirrors to one or more detectors or cameras. One or more beamsplitters may be included to produce two or more optical channels for simultaneous imaging. The beamsplitter may be a beamsplitter cube having field correction structures. Embodiments may have high beam quality and may be diffraction-limited with relatively wide fields of view (FOV). A cold shield may be included that reduces MWIR or LWIR reflections at a MWIR or LWIR focal plane array. A laser illumination or designation system may be included.

54 Claims, 10 Drawing Sheets

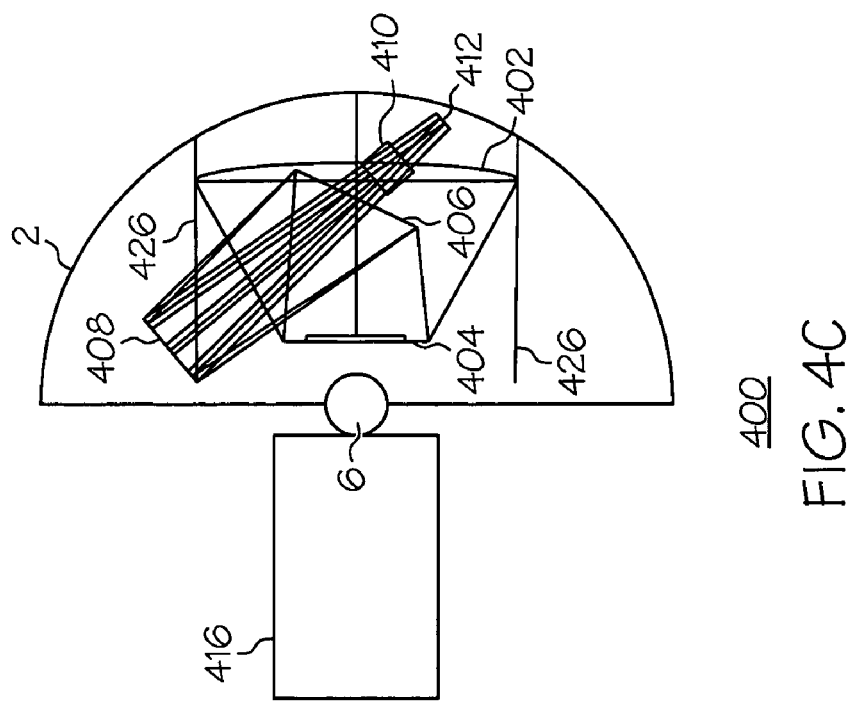
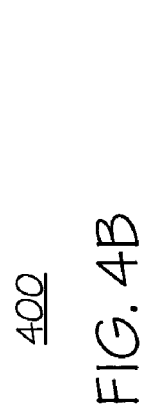
FIG. 4C
FIG. 4B

SPHERICALLY-ENCLOSED FOLDED IMAGING SYSTEM

BACKGROUND

Movable sensor turrets have been developed that provide the ability to direct imaging systems and illumination systems contained within a turret housing in a desired direction. In certain applications, such as those for use on aircraft and other moving platforms, sensor turrets may include a moveable spherical housing or sensor "ball" for improved aerodynamics. The spherical housing or ball is often part of a gimbal or pivot assembly and may be able to rotate on one or more axes. In certain applications, a sensor turret or sensor ball may contain stabilization features such as gyroscopes and actuators for improved imaging.

Because of the limited space available within a given sensor turret or sensor ball, the included imaging systems have previously been limited in size, e.g., the primary mirror size for a given focal length, and/or field quality. Furthermore, the presence of one imaging or illumination system within a sensor ball has typically precluded the simultaneous use of different systems for other illumination and imaging purposes.

What is needed therefore are systems and methods for obtaining compact, high field-quality spherically-enclosed imaging systems for use within a sensor ball of a given size. What is further needed are systems and methods for obtaining spherically-enclosed imaging systems that have relatively wide fields of view (FOV).

SUMMARY

Embodiments of the present invention are directed to systems and methods for obtaining compact, high field-quality folded imaging systems for use within a sensor ball of a given size. The spherically-enclosed folded imaging systems may be diffraction-limited and may have relatively wide fields of view (FOV).

A first embodiment of the present invention may include an imaging system adapted to fit within a spherical housing. The imaging system may include a primary mirror that has a diameter that is smaller than an interior diameter of the spherical housing. The imaging system may also include a secondary mirror configured to receive light reflected from the primary mirror. A first fold mirror may be configured to receive light from the secondary mirror and a second fold mirror may be configured to receive light from the first fold mirror. Light from the second fold mirror is directed to a focal plane within the spherical housing and a field of view (FOV) may be imaged within the spherical housing.

The primary and secondary mirrors may each be elliptical, parabolic, hyperbolic or spherical. The imaging system may include one or more beamsplitters to produce two or more optical channels within the spherical housing. The imaging system may include a field corrector for each optical channel. A detector may be included for one or more of the optical channels and the detectors may include a focal plane array (FPA). The second fold mirror may be transparent to a desired infrared wavelength and the imaging system may include a medium wave infrared (MWIR) or long wave infrared (LWIR) camera having a FPA, a dewar, and a cold stop. The imaging system may include a cube beamsplitter that may have correction structures. The system may be diffraction-limited. In certain embodiments, the imaging system may have an f-number between about f/3 to about f/8. The imaging system may include a cold shield operable to image a FPA onto a cold stop. The cold shield may include a centrally transmissive region. The imaging system may also include a wide field of view WFOV acquisition camera placed in a central obscuration of the secondary mirror within the spherical housing.

A second embodiment may include an illumination and detection system adapted to fit within a sphere. The illumination and detection system may include a spherically-enclosed folded imaging system having primary and secondary mirrors and two or more fold mirrors. The illumination and detection system may also include a first laser illumination system. The first laser illumination system may be operable to produce an output with a first range of wavelengths. The first range of wavelengths may be centered at about 1 micron. The first range of wavelengths may be centered at about 1.5 microns. The spherically-enclosed folded imaging system may include a MWIR or LWIR channel.

A third embodiment may include a method of constructing a spherically-enclosed folded imaging system having a wide diffraction-limited field of view. Hyperbolic primary and secondary mirrors may be placed inside a spherical housing. Two or more fold mirrors may be placed inside the spherical housing. A beamsplitter may be placed in the spherical housing to receive an input from a last fold mirror of the two or more fold mirrors. Two or more field correctors may be placed in the spherical housing. A detector or a camera may be placed in the spherical housing to receive an image from one of the two or more field correctors. The step of placing a beamsplitter in the spherical housing may include placing a cube beamsplitter having correction structures.

BRIEF DESCRIPTION OF THE DRAWINGS

These and other features, aspects, and advantages of the present invention will become better understood with regard to the following description, appended claims, and accompanying drawings. The drawings include the following:

FIGS. 4A–4C show three-channel spherically-enclosed folded imaging systems.

DETAILED DESCRIPTION

The present invention may be understood by the following detailed description, which should be read in conjunction with the attached drawings. The following detailed description of certain embodiments is by way of example only and is not meant to limit the scope of the present invention.

Embodiments of the present invention are directed to telescopes or imaging systems that are enclosed in a movable housing of a sensor turret or sensor ball. The imaging systems may be compact, high beam-quality folded imaging systems for use within a sensor ball of a given size. The spherically-enclosed folded imaging systems may have high field-quality, may be diffraction-limited and may have relatively wide fields of view (FOV). The housing may be part of a gimbal assembly and may be adapted for applications where aerodynamic considerations are important. In certain applications, the housings may be spherical or in certain embodiments it may be aspherical, e.g., an ellipsoid, oblate or prolate spheroid, etc. Embodiments may also include illumination systems.

Figure 1:
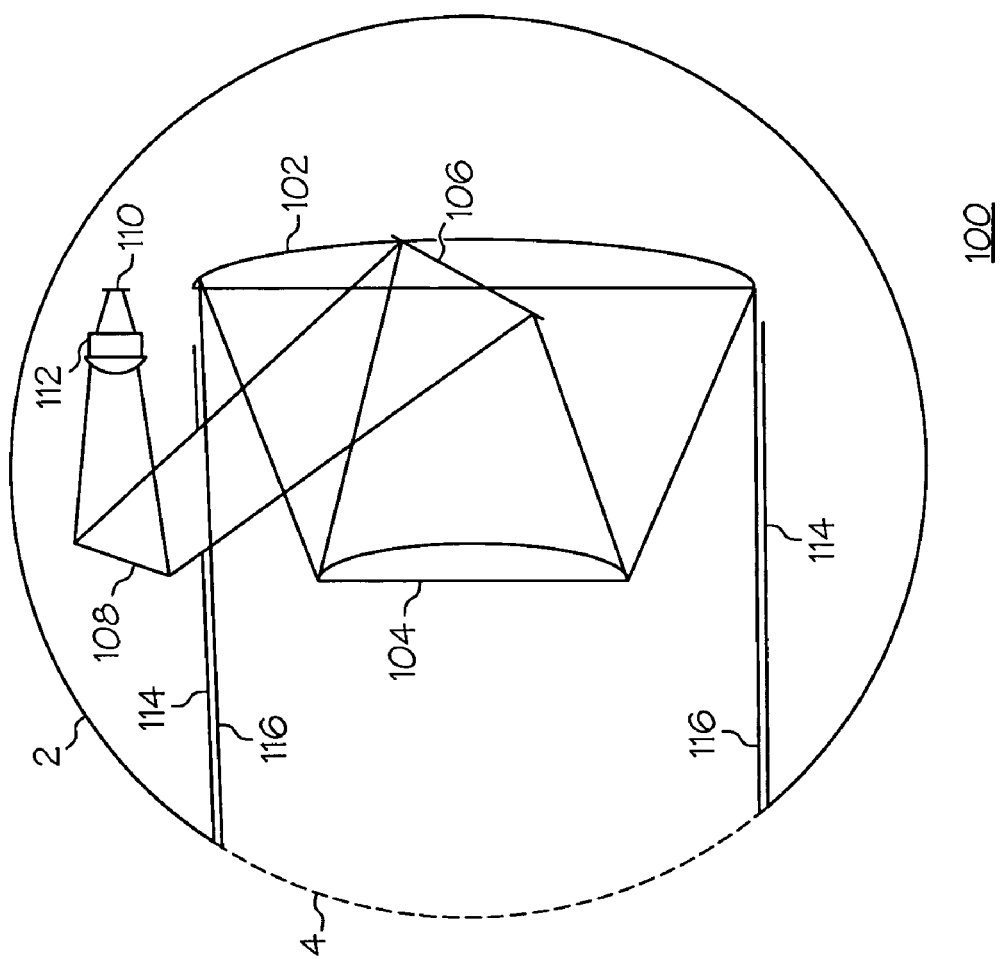
FIG. 1 shows a simplified design for a spherically-enclosed folded imaging system.

FIG. 1 shows a design for a spherically-enclosed folded telescope or folded imaging system 100. The imaging system 100 may be enclosed in a spherical housing 2 having a transparent window 4. A concave primary mirror 102 and a convex secondary mirror 104 are arranged within the spherical housing 2 to receive light entering the window 4 and to focus the light at a focal plane 110. It will be understood that for the configuration shown, the convex surface of the secondary mirror is facing the primary mirror 102 and the concave surface of the primary mirror is facing the secondary mirror 104.

First and second fold mirrors 106 and 108 are present to move the optical path off the path between the primary and secondary mirrors and to the focal plane 110. A field corrector 112 and/or a beamsplitter (not shown) may be present in the optical path between the second fold mirror 108 and the focal plane 110. When a beamsplitter is present, two or more optical channels may be created and utilized. By having one or more fold mirrors, the imaging system 100 and the optical path may be folded within a given volume to produce a short, compact, large-aperture, wide field of view imaging system.

A detector (not shown), for example, a focal plane array (FPA), may be placed at the focal plane 110 to allow viewing or recording of an image in the field of view (FOV) of the imaging system 100. A telescope tube or baffle 114 may be present to reduce stray light from entering the imaging system 100. The baffle 114 may be perforated to allow laser or sensor beams to cross. Light entering the window is depicted by ray traces 116 as shown.

Light entering the window 4 travels within the spherical housing 2 and the baffle 114 (when present) to the primary mirror 102. From the primary mirror 102, the light is reflected to the secondary mirror 104. From the secondary mirror 104, the light is reflected back toward the primary mirror 102 and travels within the cone or cylinder of obscuration produced by the secondary mirror 104. The light is then reflected by the first fold mirror 106 and travels to the second fold mirror 108. At the second fold mirror 108, the light is redirected to the field corrector 112, when present, and the focal plane 110.

The first and second mirrors 102 and 104 may be characterized by different conic constants. For example, in certain embodiments, the primary mirror 102 may be parabolic and the secondary mirror 104 may be hyperbolic, producing a Cassegrain design. In other embodiments, the primary mirror may be elliptical and the secondary may be hemispherical or vice versa, resulting in a Dall-Kirkham design and a Pressman-Carmichael design, respectively. In still other embodiments, the primary and secondary mirror may both be hyperbolic, producing a Ritchey-Chretien design.

In certain applications, portions of the volume of a spherical housing of sensor turret or ball may be occupied by various objects and equipment, e.g., structural members, illuminations systems, etc., in addition to an imaging system, e.g., system 100. Accordingly in certain embodiments, an imaging system according to the present invention may be designed to fit within a reduced volume, e.g., a hemisphere, of a given sensor ball.

Figure 2:
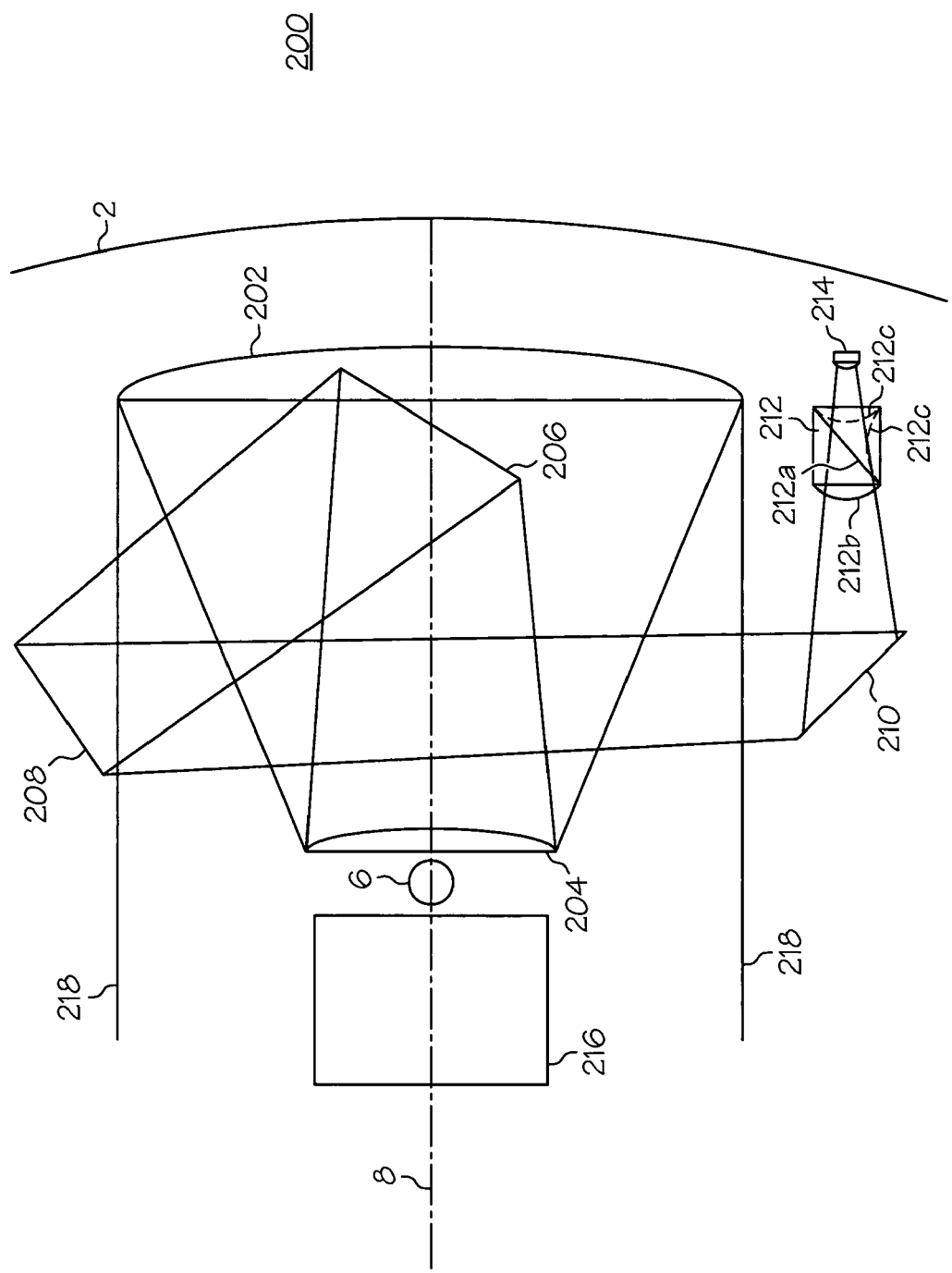
FIG. 2 shows a side view of a dual-channel spherically-enclosed folded imaging system.

FIG. 2 shows a side view of a side view of a dual-channel imaging system 200 adapted for enclosure in a hemisphere of a spherical housing of a turret or sensor ball. A concave primary mirror 202 is shown in relation to a convex secondary mirror 204. The primary mirror 202 and the secondary mirror 204 may be optically aligned, as shown, to receive light from a transparent window in a housing of the ball. Ray traces 218 are shown for rays entering the entrance aperture or window of the surrounding ball (not shown) and passing an obscuration presented by the secondary mirror 204. This embodiment may be useful when internal structure of the ball, e.g., bar 6, limits the space available within the ball. The optical axis may be folded within the spherical housing 2 as desired by inclusion of a number of fold mirrors having the appropriate orientation.

A first fold mirror 206 folds or redirects the optical path from the secondary mirror 204, e.g., as shown off of a diameter 8 of the ball. A second fold mirror 208 redirects the optical path to a third fold mirror 210, where the optical path is directed to a beamsplitter 212. In certain embodiments, the beamsplitter 212 may be a polarizing beam splitter. In certain embodiments, the beamsplitter 212 may be a cube beamsplitter made of optical glass, type BK7.

The beamsplitter 212 may have correction structures formed on the input surface and outputs surfaces to facilitate the reduction of aberrations such as spherical aberration, astigmatism, field curvature and coma. The correction structures may be spherical or aspheric, e.g., ellipsoidal, parabolic, hyperbolic. For example, a convex hemispherical correction structure 212b may be formed on the input face of the beamsplitter 212 and a convex hemispherical correction structure 212c may be formed, e.g., ground, into each of the output faces of the beamsplitter 212.

The beamsplitter 212 divides the incident light into two output channels (with only one output channel shown for clarity). A field flattener or corrector 214 may be present to improve characteristics of the focal plane, e.g., by reducing field curvature introduced by the primary and secondary mirrors 202 and 204. In certain embodiments, the primary mirror may have a hole or depression to accommodate the placement of the first fold mirror, in which case the mirror may be referred to as a "holey" mirror.

Additional systems such as a separate wide field of view acquisition (WFOV) cameras and/or laser illumination systems 216 may be placed within the ball housing in front of the obscuration created by the secondary mirror 204. Such additional systems may be limited in certain embodiments to an overall diameter equal to that of the secondary mirror and/or central obscuration.

The components of the imaging system 200, including the primary and secondary mirrors 202 and 204, may be designed and configured to fit within a sensor ball of a given diameter. For example, for the configuration shown in FIG. 2, an embodiment with a 14" hyperbolic primary mirror and a 6" hyperbolic secondary mirror was designed for enclosure within a sensor ball spherical housing with inner diameter of 20 inches. Diffraction-limited results were verified with commercial optical modeling software within a field of view (FOV) of plus or minus 0.3 degrees, for a total diffraction-limited FOV of 0.6 degrees. The throughput of the imaging system was determined to be 78%. The software used was ZEMAX software. ZEMAX is a registered trademark for software for optical design by ZEMAX Development Corporation.

Figure 3:
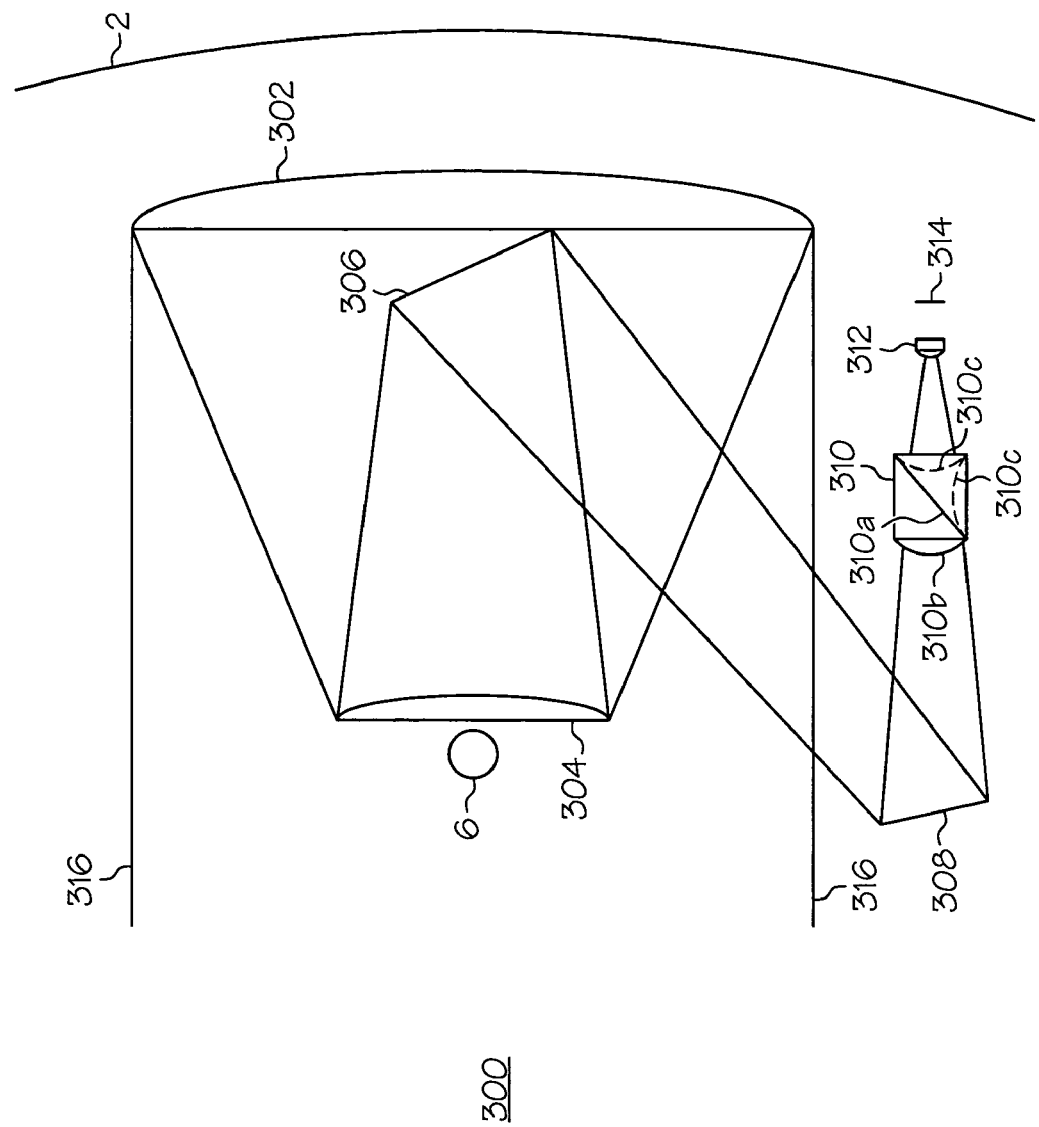
FIG. 3 shows an alternate dual-channel spherically-enclosed folded imaging system.

FIG. 3 shows a spherically-enclosed folded imaging system 300 in which a second fold mirror 308 is placed ahead of an obstructing internal support bar 6 of a surrounding spherical housing 2. A concave primary mirror 302 and a convex secondary mirror 304 are aligned as shown. A first fold mirror 306 is positioned to redirect the optical axis away from the primary mirror 302 to the second fold mirror 308. Ray traces 316 are show for light that has entered the spherical housing 2 through a window (not shown).

The second fold mirror 308 may be placed ahead of a centrally occupied area or region of the spherical housing 2 or ball, as shown. This position of the secondary fold mirror 308 may be advantageous in certain sensor ball applications where a support bar 6 is present in the interior of the spherical housing 2.

A beamsplitter 310 may be present to create two optical channels (one channel is omitted from the drawing for clarity). The beamsplitter 310 receives light from the second fold mirror 308. The beamsplitter 310 may be a cube beamsplitter with a mirrored surface 310a, an input surface 310b, and two output surfaces 310c. The input surface 310b and output surfaces 310c may have correction structures, similar to the embodiment of FIG. 2. For each optical channel leaving the beamsplitter, a beam corrector 312 may be present. Each of the optical channels may be received by a desired device or element, e.g., a focal plane array (FPA) 314, a camera, etc.

For the configuration shown in FIG. 3, slower optical systems with higher f-numbers (f/#) may be achieved for a given primary mirror size. The configuration shown may additionally facilitate the use of a primary mirror 302 that approaches the inner diameter of the enclosing spherical housing 2 while still allowing for the placement of one or more additional illumination or imaging systems within the central obscuration of the folded imaging system 300.

Figure 4A:
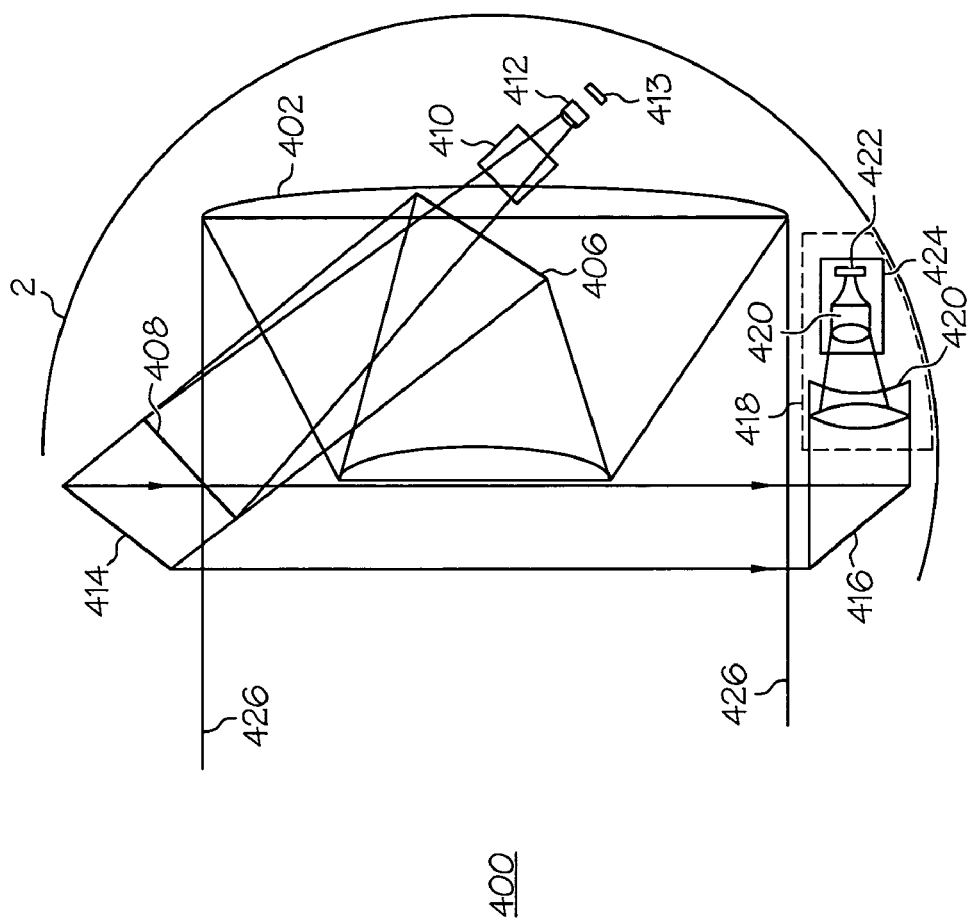

FIG. 4A shows a three-channel spherically-enclosed folded imaging system 400 including three optical channels, e.g., two near infrared channels (NIR) and a medium-wave infrared (MWIR) channel. A concave primary mirror 402 is aligned with a convex secondary mirror 404. A first fold mirror 406 directs light reflected from the secondary mirror 404 to a second fold mirror 408. The primary mirror 402 and the first fold mirror 406 are shown as "holey" mirrors, i.e., each mirror has a central hole through which light can pass. The central holes may be formed with a desired orientation to allow the optical path of the imaging system 400 to pass through the mirror in a desired direction. In certain embodiments, the first fold mirror 406 may be positioned within a hole or depression in the primary mirror 402. Ray traces 426 are shown for light that has entered the spherical housing 2 through a transparent window (not shown).

The first fold mirror 406 receives light from the secondary mirror and is tilted to reflect the light to a second fold mirror 408. The second fold mirror 408 is configured to receive the light from the first fold mirror 406 at an incidence angle of zero degrees. Because of the zero-degree incidence angle, the second fold mirror 408 reflects the light back in the direction of the first fold mirror 406. Due to the focusing effect of the primary and secondary mirrors 402 and 404, the light returning to the first fold mirror 406 converges and occupies a smaller area than when it first left that mirror 406.

As a result of this focusing effect, the returning light passes through the hole in the first fold mirror 406.

The light that returns from the second fold mirror 408 and passes through the hole in the first fold mirror 406 also passes through a hole in the primary mirror 402. The light passing through the hole in the primary mirror 402 is received by a beamsplitter 410 that splits the incoming light into two output channels (one channel is omitted for clarity). A field corrector 412 may be used with each output channel of the beamsplitter to improve field characteristics at a detector 413, which may be a suitable focal plane array (FPA).

The field corrector 412 may include one or more refractive elements to correct field curvature, astigmatism, and/or coma. The detector may be of any suitable material appropriate for detection of the particular optical channel. For example, in certain embodiments, detector materials may include indium antimonide (InSb) for detection of wavelengths from 1–5 microns. Also, mercury cadmium telluride (HgCdTe) may for example be used in certain application for wavelength ranges from 0.85–2.5 microns in FPAs, e.g., the HAWAII 2 FPA from Rockwell Scientific Company.

The second fold mirror 408 may be transparent to a desired infrared range, e.g., a medium-wave infrared (MWIR) range of 3–5 microns or a long-wave infrared (LWIR) range of 9–12 microns, and a corresponding infrared (IR) channel may accordingly be extracted from for infrared imaging at a focal plane array 416 of suitable infrared detectors. In certain embodiments, the second fold mirror may be made of germanium or a germanium material, e.g., germanium oxide (GeO), zinc germanium (ZnGe), etc. One of skill in the art will recognize that other suitable infrared transparent materials may be used for the second fold mirror 408.

One or more IR, e.g., MWIR, fold mirrors, e.g., mirrors 414 and 416, may direct the IR light extracted from the second fold mirror 408 to a IR camera, e.g., a MWIR camera 418. The MWIR camera 418 may include relay optics such as one or more lens pairs 420 and a MWIR detector or focal plane array (MWIR FPA) 422. A dewar 424 may be present in certain embodiments to cool the MWIR FPA 422 for improved detection and imaging at desired wavelengths. A field corrector may optionally be used for the MWIR channel. In certain embodiments, a LWIR optical relay chain including a LWIR FPA and LWIR fold mirrors may be used.

For the configuration shown in FIG. 4A, an embodiment having a Ritchey-Chretien design with a hyperbolic 14" primary mirror 402 and hyperbolic 6" secondary mirror 404 was verified with commercial optical modeling software as having a diffraction-limited field over a FOV of plus or minus 0.4 degrees, for a total of 0.8 degrees diffraction-limited FOV. The throughput for this embodiment was determined to be 80%. The software used was ZEMAX software for optical design by ZEMAX Development Corporation.

FIG. 4B is a front view and FIG. 4C is a corresponding side view of an embodiment 400, similar to the embodiment shown in FIG. 4A, with a primary mirror 402 of different size and a slightly different position of the secondary mirror 404 relative to a surrounding spherical housing 2. The MWIR or LWIR channel is omitted for the sake of clarity. A central bar 6 is shown that may be part of the structural support of the spherical housing 2. Ray traces 426 are shown for light that has entered the spherical housing 2.

For the configuration shown in FIGS. 4B and 4C, an embodiment having a Ritchey-Chretien design with a hyperbolic 11" primary mirror 402 and hyperbolic 6" secondary mirror 404 was verified with ZEMAX commercial optical modeling software as having a diffraction-limited field over plus or minus 0.4 degrees, for a total of 0.8 degrees diffraction-limited FOV. The embodiment was designed to fit within a 20" diameter MX-20 sensor turret, or multi-sensor payload, produced by L3 WESCAM of Burlington, Ontario, Canada. The size of the diffraction-limited field of view represents an improvement over previous imaging systems having a comparable overall system depth.

Figure 5:
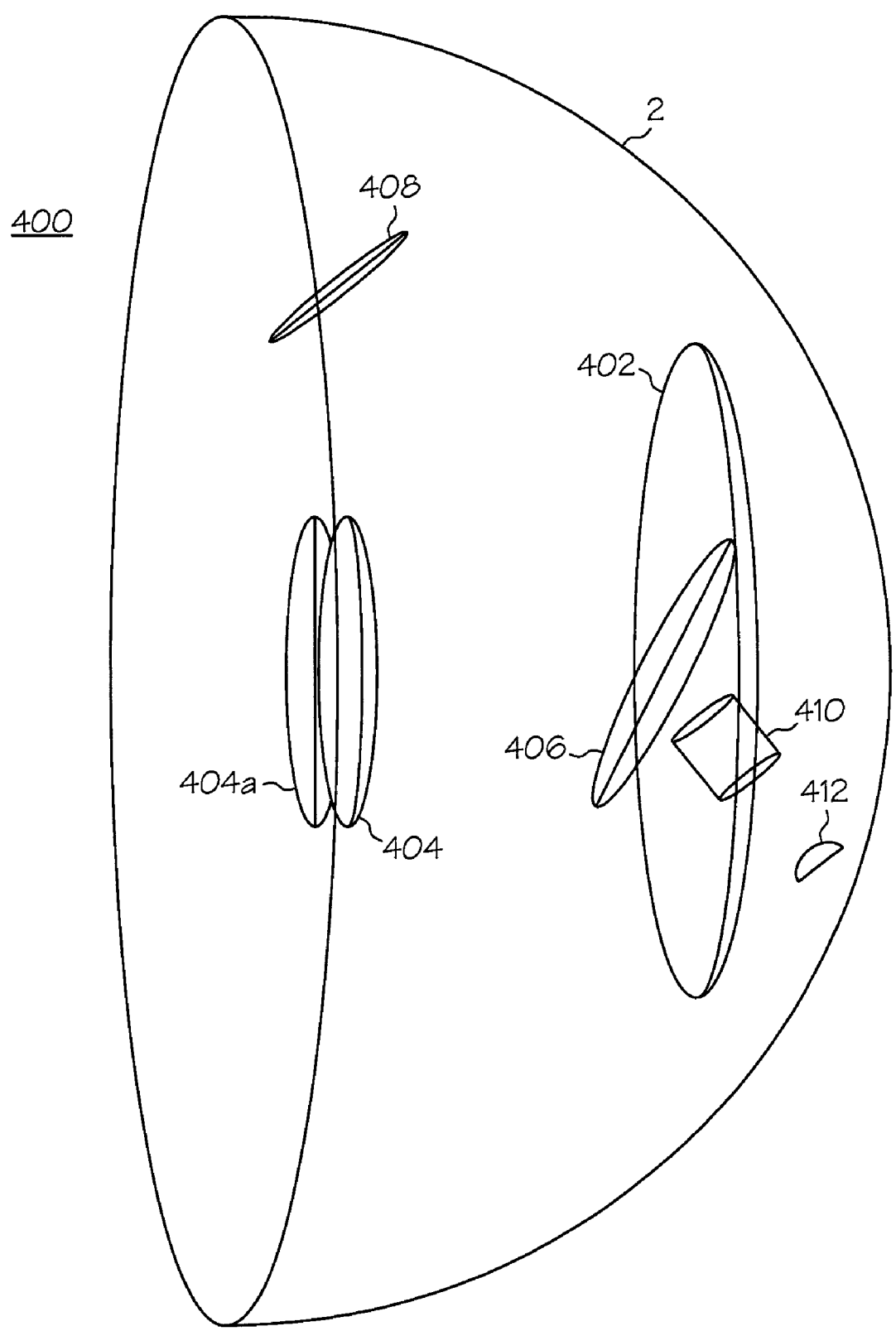
FIG. 5 is a perspective view of the imaging system of FIGS. 4B and 4C.

FIG. 5 is a perspective view of the imaging system of FIGS. 4B and 4C. A hemisphere of a spherical housing 2 is shown which surrounds the primary mirror 402 and the secondary mirror 404. In certain embodiments, the primary and secondary mirrors may be centered on a radius of the spherical housing 2, for example as shown. In alternate embodiments, the primary and secondary mirrors 402 and 404 may be located at other locations within a spherical housing 2, e.g., along a chord. A central obscuration 404a created by the secondary mirror 404 is shown.

As described for FIG. 4A, the first fold mirror 406 receives light from the secondary mirror and is tilted to reflect the light to a second fold mirror 408. The second fold mirror 408 is configured to receive the light from the first fold mirror 406 at an incidence angle of zero degrees. Because of the zero-degree incidence angle, the second fold mirror 408 reflects the light back in the direction of the first fold mirror 406.

The primary and secondary mirrors 402 and 404 focus the light so that when reflected from the second fold mirror back to the primary fold mirror 406 the light converges and occupies a smaller area. As a result the returning light passes through the holes in the first fold mirror 406 and primary mirror 402. The light passing through the first fold mirror 406 from the second fold mirror 408 is then received by the beamsplitter 410. The beamsplitter 410 then directs the light to the field corrector 412.

TABLE 1 shows the optical prescription data for the construction and/or optical modeling of one embodiment according to FIGS. 4B and 4C. The surface number that light would encounter sequentially after being admitted to a ball through a transparent window, e.g., window 4 in FIG. 1, is indicated in Col. 1. The radius of curvature of each surface is given in Col. 2, in units of inches. Col. 3 indicates the distance between successive surfaces, in units of inches. Col. 4 indicates the type of material for a particular optical element in the optical prescription. Col. 5 indicates the diameter of a particular optical element. The conic or aspherization constant for each optical element is given in Col. 6. Further comments for particular points in the optical path are indicated in Col. 7, with corresponding explanations, e.g., "coordinate break" indicating a direction change, are provided in the Footnotes at the bottom of Table 1.

TABLE 1

14" Ritchey-Chretien Design for a 20" Ball

| Surface Col. 1 (#) | Curvature Col. 2 (inches) | Thickness Col. 3 (inches) | Glass Col. 4 (type) | Diameter Col. 5 (inches) | Conic Col. 6 (constant) | Comments Col. 7 (see footnote) |
| --- | --- | --- | --- | --- | --- | --- |
| 0 | Infinity | Infinity | | | 0.00 | FN1 |
| 1 | Infinity | 10.4284 | | 14.11768 | 0.00 | FN2 |
| 2 | −11.000 | −2.00 | | 14.00723 | 0.00 | FN3 |
| 3 | −26.68463 | −7.79 | Mirror | 14.01283 | −1.06832 | FN4 |
| 4 | −14.54667 | 7.040265 | Mirror | 6.054605 | −2.994555 | |
| 5 | — | 0.00 | — | — | — | FN5 |
| 6 | Infinity | 0.00 | Mirror | 5.04547 | 0.00 | |
| 7 | — | −12.41821 | | — | — | FN6 |
| 8 | — | 0.00 | | — | — | FN7 |
| 9 | Infinity | 0.00 | Mirror | 1.673698 | 0.00 | |
| 10 | — | 1.261032 | | — | — | FN8 |
| 11 | 2.50706 | 1.234671 | BK7 | 1.372982 | 0.00 | |
| 12 | 1.234745 | 1.231172 | | 0.9567053 | 0.00 | |
| 13 | 0.6507285 | 0.06173355 | BK7 | 0.8400265 | 0.00 | |
| 14 | 0.7478314 | 0.2481511 | | 0.8216853 | 0.00 | |
| 15 | | | | 0.7899602 | 0.00 | FN9 |

Footnotes
FN1: Object-Entrance Pupil Diameter = 13.998 inches
FN2: Circular Obscuration, Maximum Radius = 7 inches
FN3: Circular Aperture, Maximum Radius = 14 inches
FN4: System Stop
FN5: Coordinate Break
FN6: Coordinate Break
FN7: Coordinate Break
FN8: Coordinate Break
FN9: Image FIG. 6 includes a front view, FIG. 6A, and a side view, FIG. 6B, of an alternate design for a spherically-enclosed three-channel folded imaging system 600. The three optical channels may be for example two near infrared channels (NIR) and a medium-wave infrared (MWIR) channel. A concave primary mirror 602 is aligned with a convex secondary mirror 604. A first fold mirror 606 directs light reflected from the secondary mirror to a second fold mirror 608. A surrounding spherical housing 2 is shown with a support bar 6. Ray traces 616 are shown for light that has entered the spherical housing 2 through a window (not shown).

The second fold mirror 608 directs light to a beam splitter 610 that splits the incoming light into two output channels (one channel is omitted for clarity). A field corrector 612 may be used with each output channel of the beamsplitter to improve beam characteristics at a detector (not shown). The field corrector 612 may include one or more refractive elements to correct field curvature, astigmatism, and/or coma.

The second fold mirror 608 may be transparent to a desired optical range, e.g., a MWIR range of 3–5 microns, a LWIR range of 9–12 microns, etc. A third optical channel may be accordingly extracted from the second fold mirror 608.

Figure 6B:
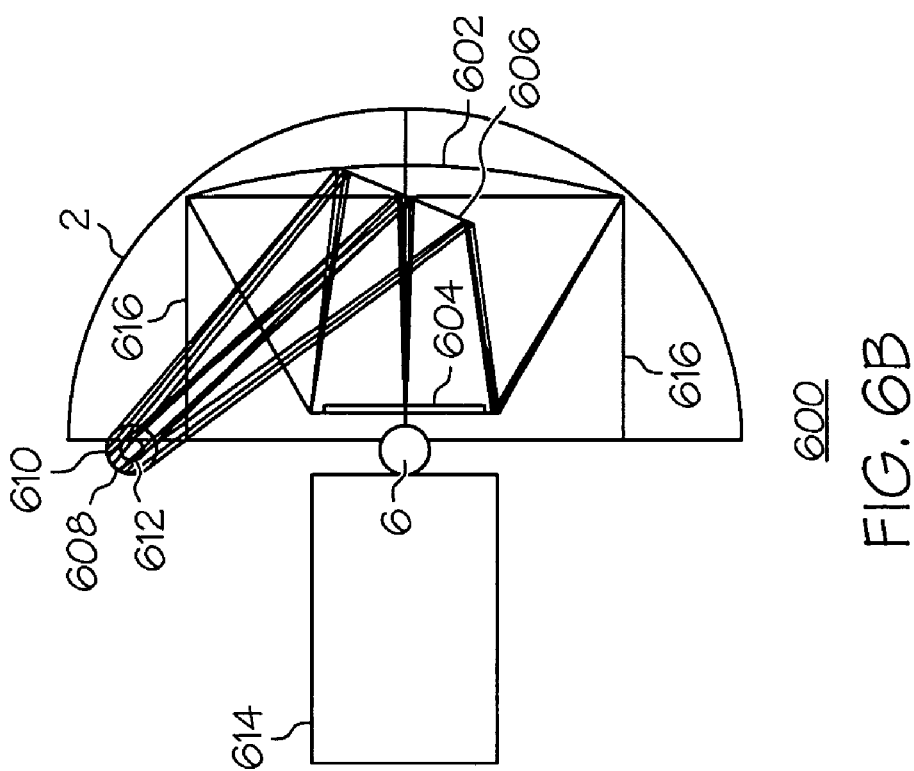
FIG. 6 includes FIG. 6A and FIG. 6B, which show front view and side views respectively of an alternate three-channel spherically-enclosed folded imaging system.

A wide field of view acquisition and illumination (WFOV) system 614 may be included within the ball 2 in the central obscuration of the secondary mirror 604 as shown in FIG. 6B. In certain embodiments, the WFOV system 614 may have a zoom lens capability with a variable field of view from 4 to 20 degrees. The WFOV system 614 may have target acquisition and/or laser illumination capability in the visible and infrared ranges. For example, the WFOV system 614 may include a laser operating at 1 micron and/or 1.5 micron for target illumination and designation.

Figure 6A:
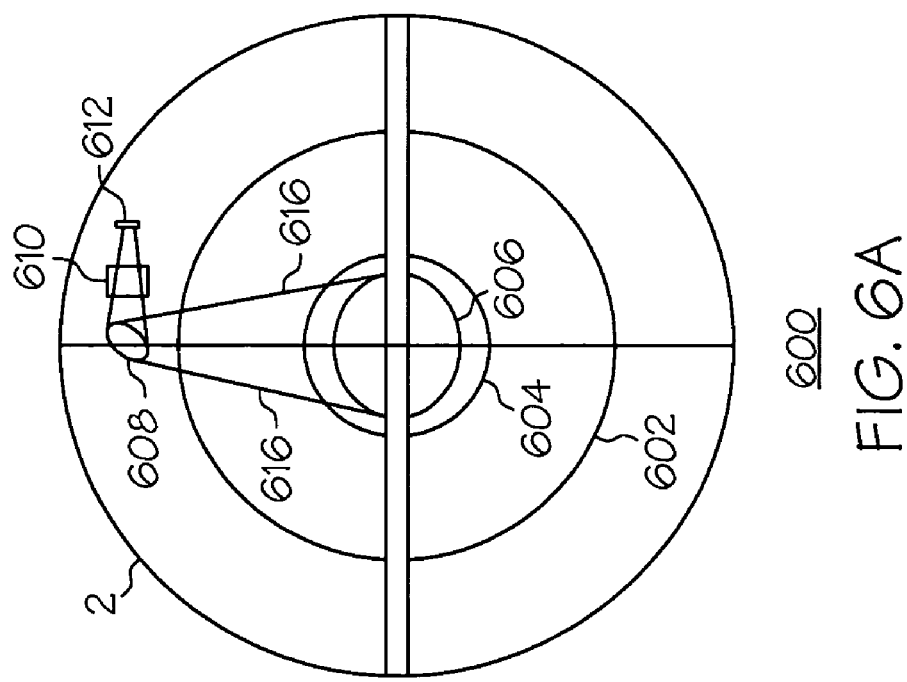

For the configuration shown in FIGS. 6A and 6B, an embodiment having a Ritchey-Chretien mirror design with a hyperbolic 14" primary mirror 402 and hyperbolic 6" secondary mirror 404 for use in a 20" ball was verified with ZEMAX commercial optical modeling software as having a diffraction-limited field over a FOV of plus or minus 0.4 degrees, for a total of 0.8 degrees diffraction-limited FOV. The f-number of the embodiment was f/4 and the throughput was 80%. The Airy disk was determined to be 6.4 microns in diameter.

Figure 7:
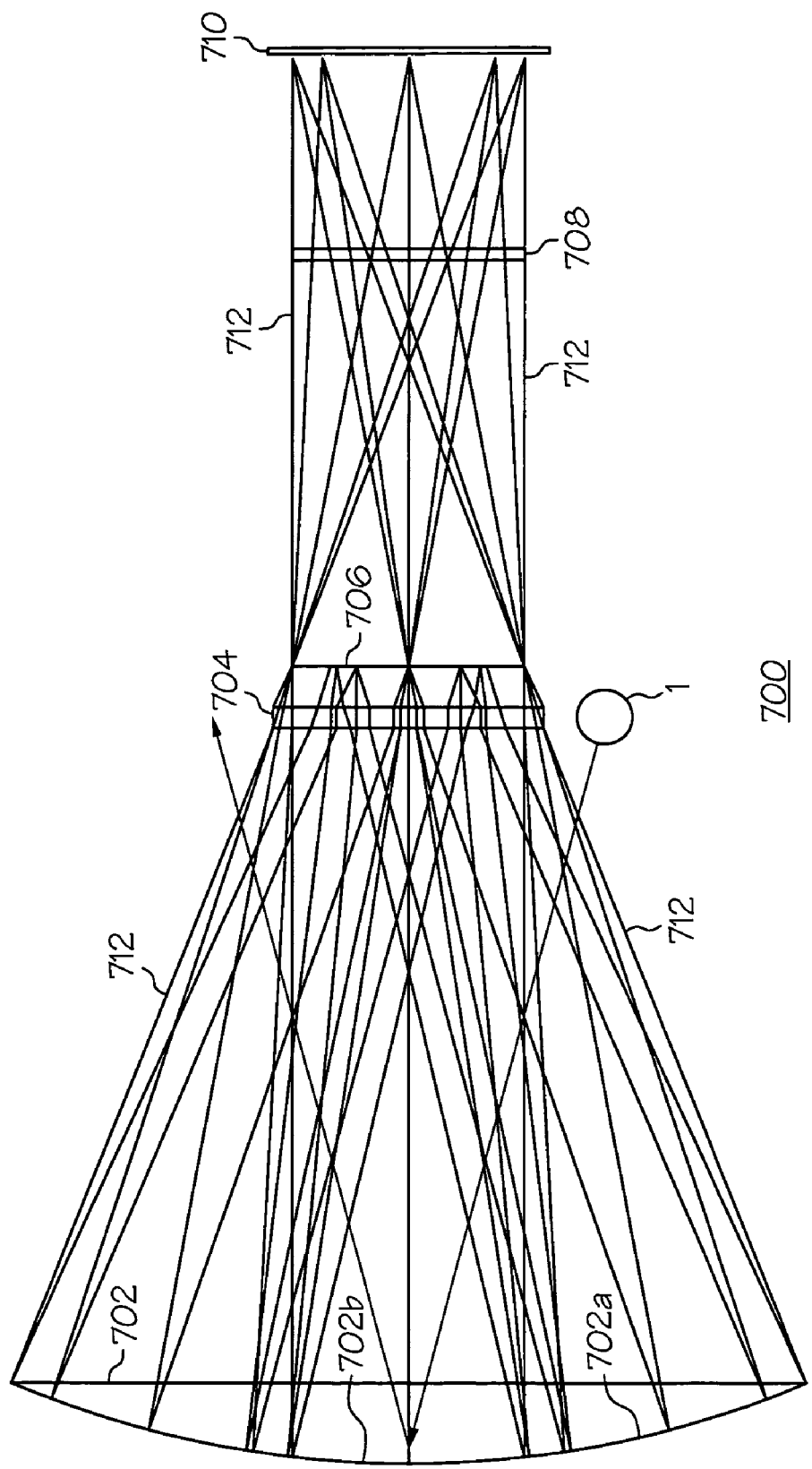
FIG. 7 shows a cold shield for use in certain embodiments having one or more infrared channels.

FIG. 7. shows a cold shield 700 used as part of a spherically-enclosed folded imaging system, for example imaging system 400 in FIG. 4A, that has an MWIR channel and a dewar-cooled FPA 710. A dewar may be included and is indicated by dewar window 704. An MWIR optical element 702 with relay surface 702a may be present in the MWIR optical relay chain outside of the dewar 704. The MWIR optical element 702 and relay surface 702a may be designed to image the MWIR FPA 710 onto a cold stop 706 inside of the dewar 704. The relay surface 702a may include a coating 702b that is reflective to MWIR wavelengths. In certain embodiments, the cold shield 700 may be for a LWIR channel and may have corresponding LWIR optical elements.

A cold filter 708 may be present within the dewar 704 to facilitate attenuation of wavelengths outside of the MWIR or LWIR range of interest. Suitable cold filter materials may be selected as desired. In certain embodiments, the MWIR or LWIR optical element may be part of a filter wheel.

Ray traces for an image of the focal plane 710 are shown reimaged onto the cold stop 706. A warm emitter 1 is shown, with ray traces from the warm emitter 1 being reflected from the optical relay surface 702a and away from the dewar window 704. The cold shield 700 may reduce stray MWIR or LWIR light, including thermally-emitted IR-wavelength photons from the "warm" elements of the MWIR or LWIR optical relay chain, from being received by the MWIR or LWIR FPA 710. The cold shield 700 may accordingly allow attenuators and filters outside of the dewar 704 to act as "cold" elements, even though they are not actually inside the dewar 704.

In certain embodiments, the coating 702b may be on an element of the MWIR or LWIR optical relay chain immediately exterior to the dewar window 704, with no intervening optical elements between the dewar window 704 and the coating 702b. One of skill in the art will understand that the coating 702b may be placed on other optical elements in the MWIR optical relay chain.

Figure 8:
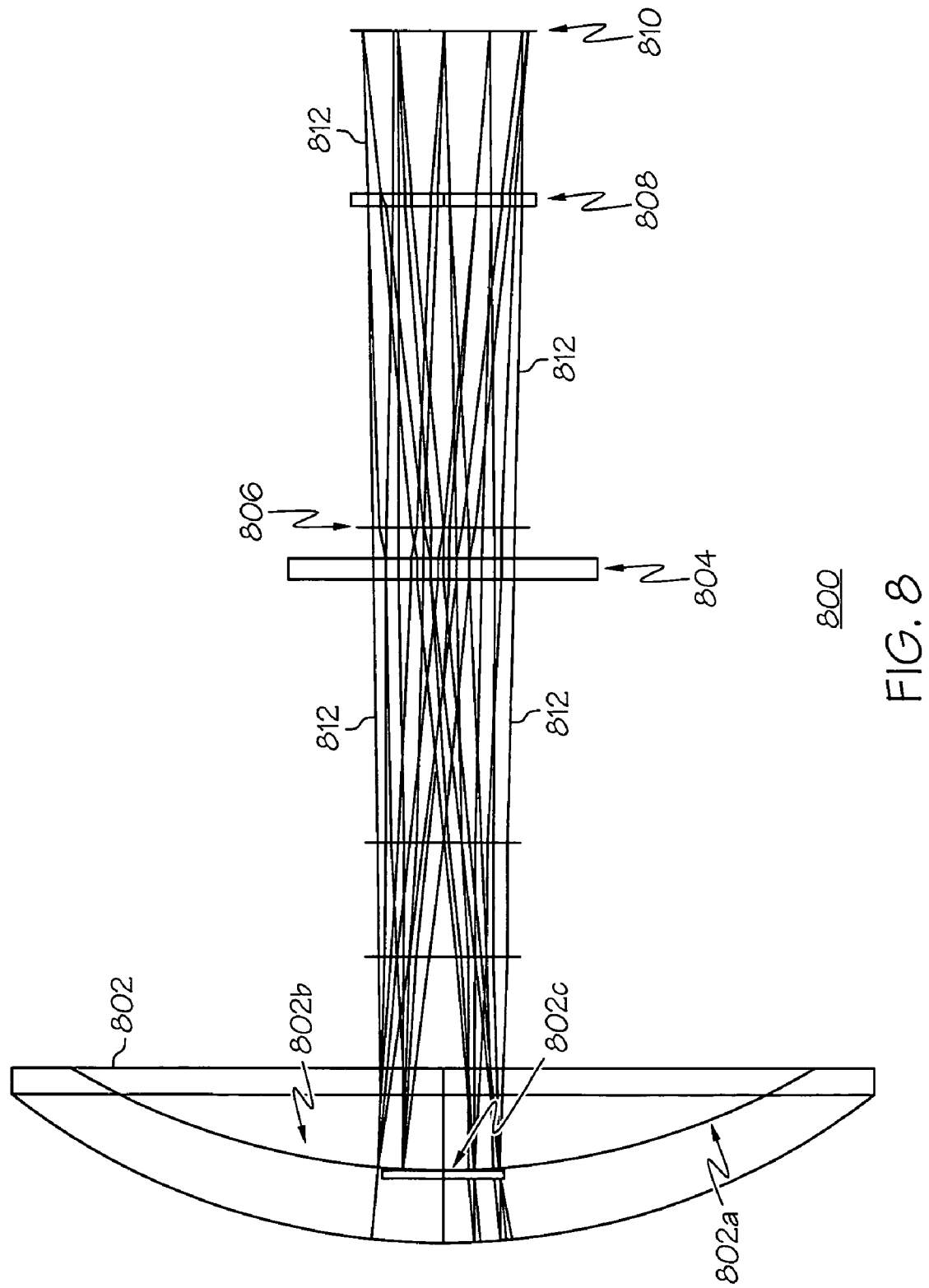
FIG. 8 shows an alternate design of a cold shield.

FIG. 8 shows an alternate embodiment of cold shield 800 with ray traces shown originating from a MWIR focal plane array (FPA) 810 inside of a dewar 804. An MWIR element 802 in the MWIR optical relay chain may have a coating 802b on a relay surface 802a. The relay surface may 802a may be adjacent to the dewar 804, indicated by dewar window 804. The coating 802b may be designed to act as an attenuator or passband filter. The MWIR element 802 may in certain embodiments be part of a filter wheel. The focal point of the coated relay surface 802a is designed to be located at the position of a cold stop 806 within the dewar 804 so that the image of the MWIR FPA 810 is reimaged or focused onto the cold stop 806. In certain embodiments, the cold shield 800 may be for a LWIR channel and may have corresponding LWIR optical elements.

A central portion of the relay surface 802a may be coated to transmit MWIR wavelengths and may act as a central transmissive portion 802c. Alternatively, a central transmissive region 802c may be constructed by removing or deleting a central portion of coating 802b from the element surface 802a. Stray light from the MWIR image of the central obscuration of the secondary mirror, e.g., secondary mirror 404, may be blocked or filtered by the inclusion of the central transmissive region 802c. The central transmissive region 802c may accordingly modify the effective diameter of the cold stop 806 of a MWIR camera. For example, a cold stop of an existing camera can be modified, e.g., changing a F/2.6 stop to a F/8 stop.

Figure 9:
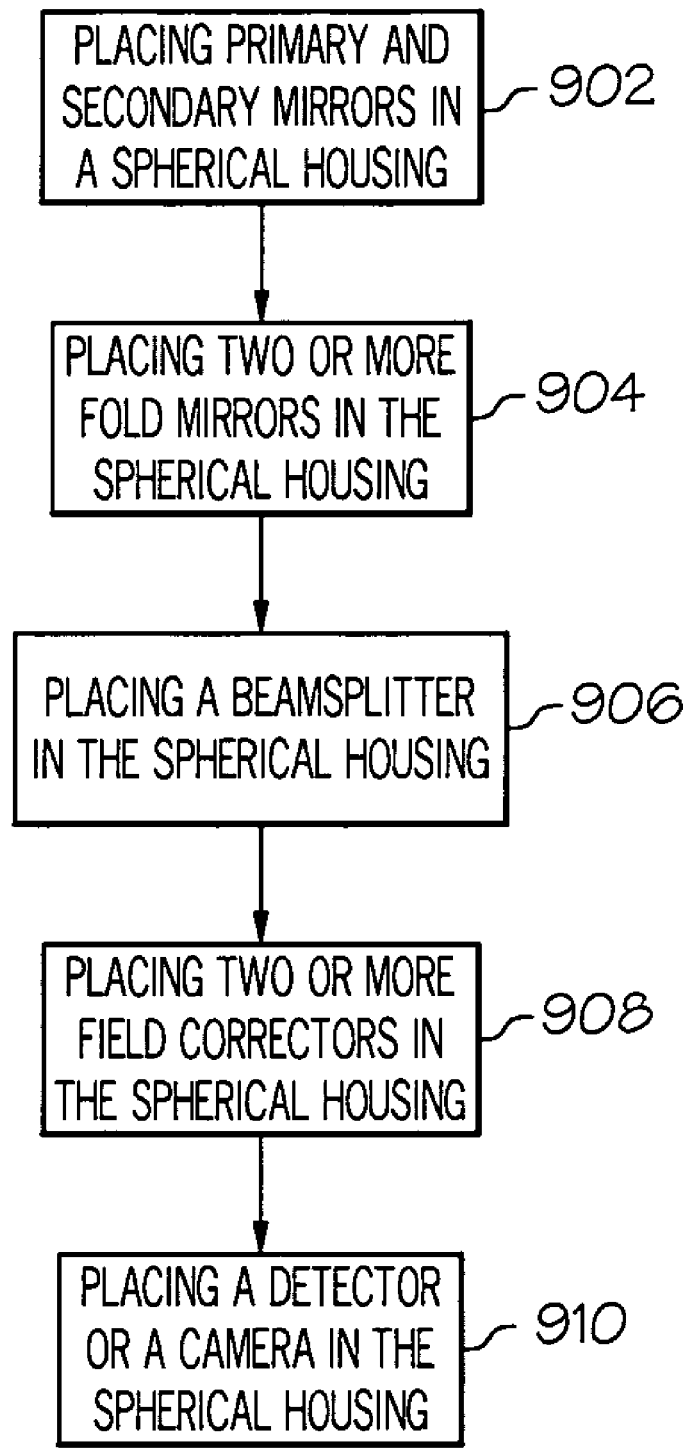
FIG. 9 shows steps in a method of manufacturing a spherically-enclosed folded-imaging system.

FIG. 9 shows steps in a method 900 of constructing a spherically-enclosed folded imaging system. Primary and secondary mirrors may be placed 902 inside a spherical housing. The primary and secondary mirror may have any conic constant. Two or more fold mirrors may also be placed 904 inside the spherical housing and may be configured to direct light from the secondary mirror away from the primary mirror. A beamsplitter, optionally having correction structures, may be placed 906 in the spherical housing and may be configured to receive an input from a last fold mirror of the two or more fold mirrors. A field corrector may be placed 908 within the spherical housing to receive an output channel from the beamsplitter. A detector or camera may also be placed 910 in the spherical housing to receive an image from a field corrector. In certain embodiments, the step of placing a camera in the spherical housing may further include the step of placing an MWIR camera with a dewar in the spherical housing. An imaging system constructed by the above method 900 may be diffraction-limited and may have a wide field of view for one or more optical channels. The one or more channels may be in the UV, visible, NIR, MWIR and LWIR wavelength ranges.

Operation of a folded imaging system will now be described with reference to the drawings. An imaging system, e.g., imaging system 400, may be placed within a spherical housing of a sensor turret or sensor ball as a compact, high magnification imaging system. A wide field of view (WFOV)acquisition imaging system or camera may be placed within the central obscuration created by the secondary mirror of the imaging system. The acquisition system may act as a spotting system and the imaging system may act to magnify the FOV once a desired target or object is located with the WFOV system. In certain embodiments, the WFOV acquisition imaging system may have a WFOV of about 4 to 20 degrees.

Once a target or object of interest is acquired within the FOV of the imaging system 400, it may be viewed or recorded. The object may be viewed in real time, image signals may be recorded for post processing, and pictures may be taken on each of the one or more optical channels.

In certain embodiments, a laser illumination system may be included within the spherical housing illuminate a target. The target may be imaged with a spherically-enclosed folded imaging system, e.g., system 600 of FIG. 6. In certain embodiments, a laser designation system may be included within the spherical housing to designate the target by illumination at a specified wavelength, e.g. 1.5 microns.

Thus, by having fold mirrors the present invention may provide short, compact, large-aperture, wide field of view telescopes or imaging systems within the confines of an enclosing spherical housing of a turret or sensor ball. Two or more optical channels may be created with the use of a beamsplitter.

A beamsplitter may be used to provide improved field and aberration corrections. The beamsplitter may be a cube beamsplitter. By optionally included field correction structures, such a beamsplitter may further improve beam quality and may facilitate diffraction-limited field characteristics. The ability to have a short, compact imaging system with a low f-number (f/#) increases the magnification ability and brightness of the imaging system.

Embodiments may be diffraction limited, including certain embodiments having Ritchey-Chretien mirror designs. For example, the embodiments described above for FIGS. 2–7 have been validated as diffraction limited by commercial optical modeling software when the primary and secondary mirrors are designed as hyperbolic. The software used was ZEMAX software for optical design by ZEMAX Development Corporation.

Cold shields as described above may allow "commercial-off-the-shelf" (COTS) MWIR cameras to be improved or modified for use in spherically-enclosed folded imaging system. By inclusion of a filter wheel, a cold shield may provide remote change capability of MWIR optical channel characteristics, e.g., cold stop size, bandpass characteristics, etc.

Although the present invention has been described in detail with reference to certain preferred version thereof, other versions are possible. For example, while use of hyperbolic primary and secondary mirrors in Ritchey-Chretien designs have been described above in certain detail, the primary and secondary mirrors may have other shapes, e.g., parabolic, elliptical, and hemispherical. Accordingly, the present invention includes embodiments that have Dall-Kirkham design, Press-Carmichael design, and Cassegrain designs. Such embodiments may be diffraction-limited with the inclusion of image processing means, e.g., an image processor and/or computer running a MATLAB or Interactive Data Language (IDL) deconvolution routine or other deconvolution routines, e.g., Lucy-Richardson based deconvolution routines, to remove coma and/or other aberrations.

Additionally, while embodiments described above have included a single medium wave infrared (MWIR) or long wave infrared (LWIR) channel, one or more beamsplitters may be used to produce multiple MWIR and/or LWIR channels. Furthermore, where embodiments described above have included description of MWIR channels, long infrared channels may be used with appropriate material selection of the IR relay chain and detector elements.

One of skill in the art will understand that any suitable detector or focal plane array may be used within the scope of the present invention. Focal planes may be of any desired size to capture the FOV at the focal plane. Any of various detector materials suitable for desired wavelength ranges may be used. Charged-coupled devices (CCDs) may be used in focal plane arrays in certain embodiments.

One of skill in the art will also understand that while the description above is generally directed to imaging of NIR, MWIR, and LWIR light, the scope of the present invention also includes imaging of visible light, e.g., in the 400 to 700 nanometer wavelength range, and ultraviolet (UV) light.

The reader's attention is directed to all papers and documents that are filed concurrently with this specification and which are open to public inspection with this specification, and the contents of all such papers and documents are incorporated herein by reference. All the features disclosed in this specification, including any accompanying claims, abstract, and drawings, may be replaced by alternative features serving the same, equivalent or similar purpose, unless expressly stated otherwise.

What is claimed is:

1. An imaging system adapted to fit within a spherical housing, said imaging system comprising:
    a primary mirror, wherein said primary mirror has a diameter that is smaller than an interior diameter of said spherical housing;
    a secondary mirror configured to receive light reflected from said primary mirror;
    a first fold mirror configured to receive light from said secondary mirror;
    a second fold mirror configured to receive light from said first fold mirror; and
    a beamsplitter configured to receive light from said second fold mirror, wherein said imaging system is operable to focus a field of view (FOV) within said spherical housing.

2. The imaging system of claim 1, wherein said primary mirror is concave.

3. The imaging system of claim 2, wherein said primary mirror is parabolic.

4. The imaging system of claim 2, wherein said primary mirror is hyperbolic.

5. The imaging system of claim 2, wherein said primary mirror is elliptical.

6. The imaging system of claim 2, wherein said primary mirror is spherical.

7. The imaging system of claim 1, wherein said secondary mirror is convex.

8. The imaging system of claim 7, wherein said secondary mirror is parabolic.

9. The imaging system of claim 7, wherein said secondary mirror is hyperbolic.

10. The imaging system of claim 7, wherein said secondary mirror is elliptical.

11. The imaging system of claim 7, wherein said secondary mirror is spherical.

12. The imaging system of claim 1, wherein said beamsplitter is a cube beamsplitter.

13. The imaging system of claim 12, wherein said beamsplitter comprises correction structures formed in surfaces thereof.

14. The imaging system of claim 1, further comprising a first field corrector.

15. The imaging system of claim 14, further comprising a second field corrector.

16. The imaging system of claim 14, wherein said system is operable to produce a substantially diffraction-limited image at said first detector.

17. The imaging system of claim 1, further comprising a first detector configured to receive light from said beam splitter and operable to detect a first range of wavelengths.

18. The imagining system of claim 17, wherein said first detector includes a focal plane array.

19. The imaging system of claim 1, further comprising a second detector configured to receive light from said beam splitter and operable to detect a second range of wavelengths.

20. The imagining system of claim 19, wherein said second detector includes a focal plane array.

21. The imaging system of claim 1, further comprising a second beamsplitter configured and operable to receive light from said beam splitter.

22. The imaging system of claim 1, wherein said second fold mirror is transparent to a desired infrared wavelength.

23. The imaging system of claim 22, further comprising a first infrared detector positioned within said sphere to receive infrared light through said second fold mirror.

24. The imaging system of claim 23, wherein said first infrared detector further includes a focal plane array.

25. The imaging system of claim 23, further comprising a MWIR or LWIR camera having a FPA, a dewar, and a cold stop.

26. The imaging system of claim 25, further comprising a cold shield operable to image said FPA on said cold stop.

27. The imaging system of claim 26, wherein said cold shield further comprises a reflective coating.

28. The imaging system of claim 27, wherein said reflective coating includes a centrally transmissive region.

29. The imaging system of claim 1, wherein said system has a f-number of between about f/3 to about f/8.

30. The imaging system of claim 29, wherein said system has a f-number of about f/4.

31. The imaging system of claim 29, wherein said system has a f-number of about f/6.43.

32. The imaging system of claim 1, wherein a ratio of said diameter of said primary mirror to a diameter of said spherical housing is about 11/20.

33. The imaging system of claim 1, wherein a ratio of said diameter of said primary mirror to a diameter of said spherical housing is about 7/10.

34. The imaging system of claim 1, wherein a ratio of said diameter of said primary mirror to a diameter of said spherical housing is about 9/10.

35. The imaging system of claim 1, further comprising a wide field of view (WFOV) acquisition camera disposed within a central obscuration of said secondary mirror within said spherical housing.

36. The imaging system of claim 1, further comprising a first laser illumination system disposed in said spherical housing.

37. The imaging system of claim 36, wherein said first laser illumination system is operable to produce an output with a first range of wavelengths.

38. The imaging system of claim 37, wherein said first range of wavelengths is centered at about 1 micron.

39. The imaging system of claim 38, wherein said first range of wavelengths is centered at 1 micron.

40. The imaging system of claim 36, wherein said first range of wavelengths is centered at about 1.5 microns.

41. The imaging system of claim 37, wherein said first range of wavelengths is centered at 1.5 microns.

42. The imaging system of claim 36, wherein said spherically-enclosed folded imaging system further comprises a MWIR or LWIR channel.

43. The imaging system of claim 42, wherein said MWIR or LWIR channel includes a MWIR or LWIR camera.

44. The imaging system of claim 43, wherein said camera includes a dewar, a focal plane array (FPA), and a cold shield.

45. The imaging system of claim 1, wherein said first fold mirror includes a hole disposed there through, wherein said first fold mirror is operable to allow the passage of light received from said second fold mirror.

46. The imaging system of claim 1, wherein said primary mirror includes a hole disposed there through, wherein a portion of said first fold mirror is disposed in said hole of said primary mirror.

47. The imaging system of claim 46, wherein said housing is an ellipsoid or a spheroid.

48. The imaging system of claim 1, wherein said primary mirror includes a hole disposed there through, wherein said primary mirror is operable to allow the passage of light received from said second fold mirror.

49. The imaging system of claim 1, further comprising a spherical housing surrounding said primary mirror, said secondary mirror, said first fold mirror, said second fold mirror, and said beam splitter, wherein said spherical housing includes an aperture to admit light to said primary mirror.

50. A method of constructing a spherically-enclosed folded imaging system having a wide diffraction-limited field of view comprising the steps of:
  placing primary and mirrors inside a spherical housing;
  placing at two or more fold mirrors inside the spherical housing;
  placing a beamsplitter in the spherical housing to receive an input from a last fold mirror of said two or more fold mirrors; and
  placing two or more field correctors in the spherical housing.

51. The method of claim 50, further comprising the step of placing a detector or a camera in said spherical housing to receive an image from one or said two or more field correctors.

52. The method of claim 50, wherein said step of placing a beamsplitter in said spherical housing further comprises placing a cube beamsplitter having correction structures.

53. The method of claim 50, wherein said step of placing primary and secondary mirrors inside a spherical housing comprises placing hyperbolic primary and secondary mirrors in said spherical housing.

54. An imaging system adapted to fit within an aspherical housing, said imaging system comprising:
  an aspherical housing having an aperture for admitting light;
  a primary mirror within said housing, wherein said primary mirror has a diameter that is smaller than an interior axis of said aspherical housing;
  a secondary mirror within said housing and configured to receive light reflected from said primary mirror;
  a first fold mirror within said housing and configured to receive light from said secondary mirror;
  a second fold mirror within said housing configured to receive light from said first fold mirror; and
  a beamsplitter within said housing and configured to receive light from said second fold mirror, wherein said imaging system is operable to focus a field of view (FOV) within said aspherical housing.

* * * * *